(12) United States Patent
Isayev et al.

(10) Patent No.: US 6,528,554 B1
(45) Date of Patent: Mar. 4, 2003

(54) ULTRASOUND ASSISTED CONTINUOUS PROCESS FOR MAKING POLYMER BLENDS AND COPOLYMERS

(75) Inventors: Avraam Isayev, Akron, OH (US); Chang Kook Hong, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/784,374

(22) Filed: Feb. 15, 2001

(51) Int. Cl.⁷ .................................................. C08J 3/28
(52) U.S. Cl. ....................... 522/111; 522/109; 522/110; 522/112; 522/1; 522/3; 428/128; 428/127; 442/334
(58) Field of Search ..................... 522/1, 3, 109–112; 428/128, 127; 204/157.15, 157.6, 157.62; 442/334

(56) References Cited

U.S. PATENT DOCUMENTS

| | | | | |
|---|---|---|---|---|
| 4,213,815 A | * | 7/1980 | Goldberg et al. ...... | 156/244.11 |
| 4,226,926 A | * | 10/1980 | Goldberg et al. ........... | 429/252 |
| 4,264,490 A | * | 4/1981 | Berejka ................... | 260/45.85 |
| 4,935,164 A | * | 6/1990 | Wessling et al. ........... | 252/500 |
| 5,238,992 A | * | 8/1993 | Outbuddin .................. | 524/710 |
| 5,258,413 A | | 11/1993 | Isayev et al. .............. | 521/45.5 |
| 5,284,625 A | | 2/1994 | Isayev et al. ............... | 422/128 |
| 5,554,441 A | * | 9/1996 | Gupta et al. ................ | 428/373 |
| 5,714,256 A | | 2/1998 | DeLucia et al. ............ | 428/373 |
| 5,801,106 A | | 9/1998 | Jameson ..................... | 442/334 |
| 5,952,251 A | | 9/1999 | Jackson et al. ............. | 442/340 |
| 5,977,257 A | * | 11/1999 | Waki et al. ................. | 522/111 |
| 6,010,592 A | * | 1/2000 | Jameson et al. ......... | 156/379.6 |
| 6,020,277 A | * | 2/2000 | Jameson .................. | 239/102.2 |
| 6,025,437 A | * | 2/2000 | Hirahara et al. ............ | 204/242 |
| 6,036,467 A | * | 3/2000 | Jameson .................. | 425/174.2 |

* cited by examiner

*Primary Examiner*—James J. Seidleck
*Assistant Examiner*—Sanza L. McClendon
(74) *Attorney, Agent, or Firm*—Renner, Kenner, Greive, Bobak, Taylor & Weber (57) ABSTRACT

This invention relates to a process for making polymer blends and copolymers by ultrasonic treatment during or after mixing the polymers. In the process of the present invention, an unexpected phenomenon occurs. The process brings about enhancement of the mechanical properties when compared with identical blends not subjected to ultrasonic treatment. The ultrasonic treatment of the blends is believed to enhance intermolecular interaction and improve adhesion between dissimilar polymers and make chemical bonds between polymers that otherwise are incompatible or immiscible with each other.

18 Claims, 11 Drawing Sheets

ULTRASOUND ASSISTED CONTINUOUS PROCESS FOR MAKING POLYMER BLENDS AND COPOLYMERS

TECHNICAL FIELD

The present invention relates to an ultrasonic assisted process for bringing about in situ chemical interaction between at least a small portion of the individual polymer components within a blend of at least two polymers. More particularly, the present invention relates to a process creating chemical interactions between at least two polymers by ultrasonic treatment of a mixture of such polymers during or after mixing using continuous or batch mixers. In the process of the present invention, an unexpected chemical phenomenon occurs that enhances or improves the mechanical properties of these polymer blends when compared with identical polymer blends not subjected to the ultrasonic treatment.

BACKGROUND OF THE INVENTION

Blending polymers is a useful approach for the preparation of new materials with specially tailored or improved properties that are often absent in the single component polymers. Enhanced properties of polymeric materials are achieved by developing multi-component systems in the form of polymer blends composed of two or more homopolymers. However, many polymer pairs are incompatible or immiscible with each other and exhibit either very low or no interfacial adhesion and phase separate on blending. The mechanical properties of polymer blends are strongly influenced by the strength of the interfaces between the different phases, as well as the dispersion and interaction between them.

In most cases, mixing of two dissimilar polymers results in blends that are weak and brittle. It is commonly known that, in order to achieve compatibilization, a third component, typically a block copolymer, may be added to the system. The addition of a pre-made block copolymer to an otherwise immiscible or incompatible polymer blend can lead to a reduction of interfacial tension. Such block copolymers are selected to contain blocks chemically identical to the components within the polymer blend, thereby assuring miscibility between the copolymer segments and the corresponding blend components at the interface.

Alternatively, forming blends of two or more dissimilar polymers may be achieved through an in situ chemical reaction using specifically selected or specifically tailored chemicals. This is generally known as reactive blending. Reactive blending typically relies on either the in situ formation of copolymers or the surface interaction of polymers using specifically selected or specifically tailored chemicals. The blend components themselves are chosen or modified so that reaction occurs during melt blending. Also, existing technologies for making plastic/rubber blends involve compounding components with the aid of chemicals (compatibilizers or coupling agents) or dynamic vulcanization of rubber phase components with the aid of curatives. These generally known processes, briefly introduced above, lead to modification of the polymer interfaces in multi-phase blends, and thereby to tailoring of the phase structure, and hence properties. However, these methods are restrictive in that different, specifically tailored chemicals or copolymers are required for different polymer mixtures.

Notably, economic factors play an important part in deciding how to prepare polymer blends. Those of ordinary skill in the art appreciate that existing technologies, employing specifically tailored or specially selected block copolymers and/or compatibilizers, coupling agents, or curatives, are neither optimally time effective nor cost effective.

Thus, the ability to make virtually any two or more polymers compatible with each other to produce polymer blends and copolymers exhibiting desirable mechanical properties is the focus of the present invention. The ultimate goal of polymer blending according to the present invention is a practical one of achieving commercially viable products exhibiting desirable properties at low cost. Additionally, through practice of the present invention, the recycling of various polymers and/or polymer products may also be greatly enhanced in that used polymers can be combined to achieve desirable chemical and physical properties.

SUMMARY OF THE INVENTION

In general, the present invention provides an efficient process for the production of novel polymer blends and copolymers. The process includes feeding at least two polymers to a pressurized treatment zone and treating the at least two polymers with ultrasonic waves in the pressurized treatment zone. The at least two polymers are selected from the group consisting of thermoplastics, thermosets, rubbers, and liquid crystalline polymers (LCP's).

Advantageously, the present invention overcomes the problems associated with the prior art of chemical compatibilization of polymer blends by treating blends of polymers, with ultrasound either during or after mixing using continuous-type or batch-type mixers. It is known that the mechanical properties of such blends depend upon the adhesion between components as well as the dispersion and interaction between them. After the ultrasonic treatment of such blends during extrusion, an unexpected phenomenon is found, namely, significant enhancement of mechanical properties, such as tensile strength, modulus, elongation at break and toughness, in comparison with blends not subjected to ultrasound.

Experimental data supports a conclusion that new copolymers or graft polymers are created from the blended polymers at the interface and at the vicinity of the interface between the polymers after only a very short time (in the order of a few seconds) of ultrasonic treatment under high pressures and temperatures above the melting point or glass transition temperature of the polymers, because the enhancement of mechanical properties realized for such blends after ultrasonic treatment thereof indicates that more than a simple mix of polymers is being produced. Surprisingly, these copolymers are obtained for pairs of polymers that otherwise cannot be polymerized into copolymers since they are incompatible or immiscible with each other. Thus, it is believed that this invention makes it possible to create new copolymers or graft polymers from practically any pairs of existing polymers, and such copolymers or graft polymers may be created with desirable resultant physical properties.

In the present invention, novel polymer blends are prepared through an in situ chemical interaction resulting from ultrasonic treatment. By "in situ chemical interaction" it is meant any chemical (i.e. non-physical or mechanical) interaction wherein at least a portion of the polymers blended are chemically linked via a chemical reaction. In particular, experimental evidence supports the conclusion that this in situ chemical interaction forms copolymers or grafted polymers at least a portion of the interface between the blended polymers. Generally, only a fraction of the at least two polymers blended undergo this in situ chemical interaction.

Unexpectedly, the ultrasonic treatment of polymer blends, during or after mixing, is found to greatly improve their mechanical properties. The present invention also proposes continuous and batch processes for carrying out in situ chemical interactions without adding chemicals. It is believed that ultrasonic treatment of the blends enhances intermolecular interaction and makes chemical bonds between dissimilar polymers creating a small but effective amount of copolymer or graft copolymer without the use of any chemicals.

In general, the present invention provides a process for the in situ chemical interaction of polymer blends, including the steps of feeding to a pressurized treatment zone at least two polymers selected from the group consisting of thermoplastics, thermosets, rubbers, and liquid crystalline polymers, and ultrasonically treating the polymer mixture in the pressurized treatment zone with an ultrasonic wave.

PREFERRED EMBODIMENT FOR CARRYING OUT THE INVENTION

It has been discovered that through the application of certain levels of ultrasonic amplitudes, in the presence of pressure and heat, an unexpected enhancement of the mechanical properties of polymer blends can be achieved. The process of the present invention generally entails feeding a mix of polymers selected from thermoplastics, thermosets, rubbers and LCP's into a pressurized treatment zone, and subjecting these mixtures, in the molten state, to treatment with an ultrasonic wave within this pressurized treatment zone.

Polymers designated as either rubbers, thermoplastics, thermosets, or LCP's are generally known in the art and at least two of any such polymers may be employed to practice the present invention. Non-limiting examples of useful rubbers include natural rubbers, isoprene rubbers, styrene-butadiene rubbers (SBR), butyl rubbers, nitrile rubbers, polyurethane rubbers, fluoroelastomer rubbers, silicone rubbers, ethylene propylene diene rubbers (EPDM), butadiene rubbers and chloroprene rubbers. Non-limiting examples of useful thermoplastics include polyethylenes (HDPE, LDPE, LLDPE), polypropylenes, polyvinylchlorides (PVC), polystyrene, polyesters, copolyesters, polyamides, polyimides, polyetheretherketones, polysulfones, acetals, polyarylates and polyacrylates. Non-limiting examples of useful thermosets include polyesters, polyurethanes, and epoxy resins. Non-limiting examples of useful LCP's include wholly aromatic polyesters.

Some non-limiting examples of particularly desirable polymer blends that can be enhanced through practice of the present invention include blends of polyethylene/polypropylene, HDPE/LDPE, HDPE/LLDPE, LDPE/LLDPE, polystyrene/polypropylene, polystyrene/polyethylene, polypropylene/EPDM, polyamide/EPDM, natural rubber/SBR, PVC/polyurethane wholly aromatic polyester/polyester blends, wholly aromatic polyester/rubber blends, and blends of wholly aromatic polyesters. As is generally known, these blends are difficult to produce because their respective polymer components typically are immiscible.

Despite the discussion immediately hereinabove regarding examples of useful rubbers, thermoplastics, thermosets, and LCP's, it is to be understood that the process herein is believed to be operable for a mixture of virtually any polymers. Thus, as stated above, the present invention is not to be limited to any particular mixture of polymers.

The pressurized treatment zone is preferably provided by a continuous-type mixer that ensures that the polymer blends being compounded and treated are adequately mixed using distributive and/or dispersive mixing devices so as to increase the interfacial area between the various polymers employed. Non-limiting examples of useful continuous-type mixers include single screw extruders, pin barrel extruders, twin screw extruders, single screw extruders with attached static mixers, single screw extruders with mixing sections, twin screw extruders with attached mixing sections, Buss Ko-Kneader extruders, modular twin screw extruders, and the like. Non-limiting examples of useful batch-type mixers include internal mixers such as Banbury mixers, Farrel mixers, Haake mixers, and the like.

Referring now to the drawings wherein the showings are for purposes of illustrating the preferred embodiment of the invention only and not for purpose of limiting the same, the Figures show the application of ultrasonic treatment to polymer blending.

Figure 1:
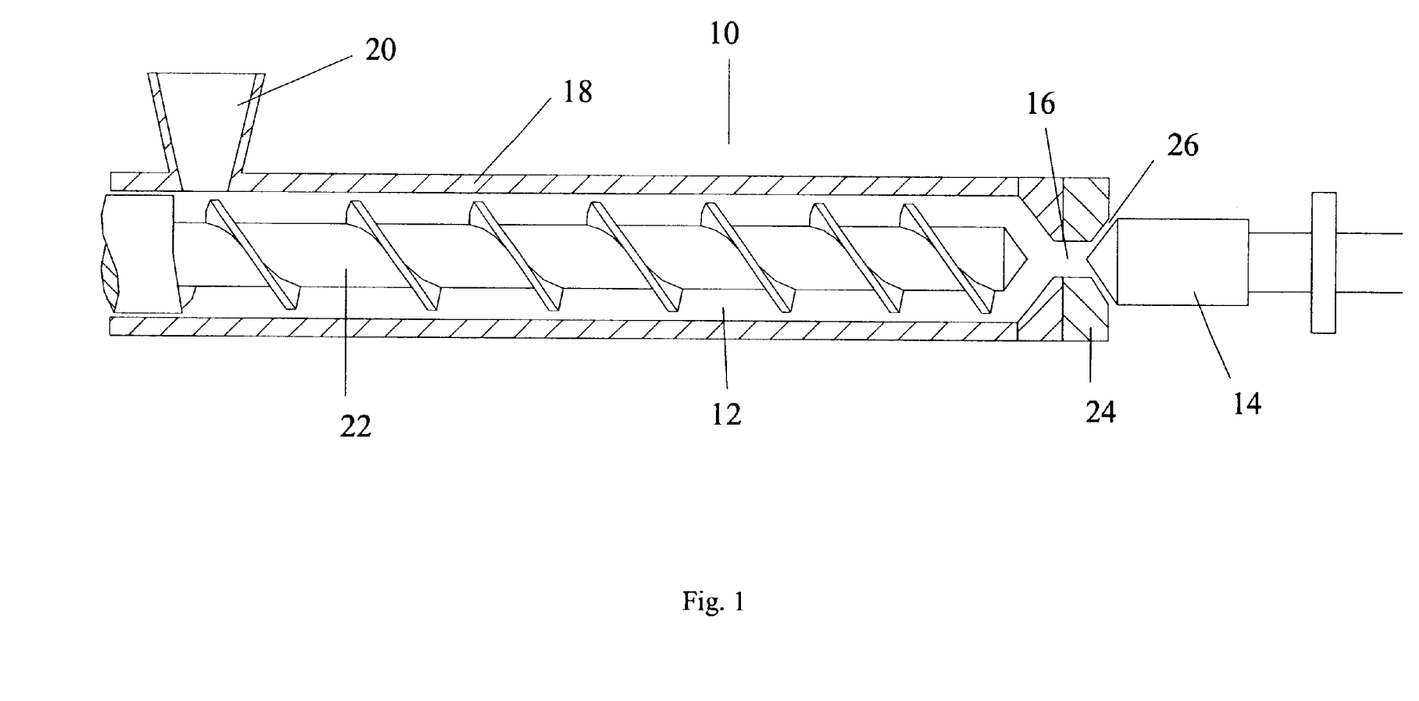
FIG. 1 is a schematic of a cross-sectional view of an ultrasonic reactor based on a single screw extruder with one ultrasonic horn placed at the extruder die parallel to the screw axis.

With reference to FIG. 1, a single horn embodiment of an apparatus for carrying out the process of the present invention is generally represented by the numeral 10. Apparatus 10 includes a single screw extruder 12 with one ultrasonic horn 14 placed at the extruder exit 16 parallel to the screw axis. As shown. single screw extruder 12 includes a barrel 18, which is fed through hopper 20. Screw 22, within barrel 18, mixes polymers fed through hopper 20 and advances the polymer mixture toward a die portion 24 and exit 16, through which the polymer mixture is extruded. A gap 26 is provided between die portion 24 and ultrasonic horn 14.

Polymer mixtures are extruded through gap 26, between horn 14 and die portion 24, by operating extruder 12 as is generally known in the art. As the polymer mixture is forced through gap 26, it is subjected to significant pressure due to the narrowing of the path through which the mixture is advanced. Additionally, as should be generally understood from the placement of horn 14, the polymer mixture is subjected to ultrasonic treatment proximate gap 26. Thus, for purposes of the present invention, it is to be generally understood that the polymer mixture is advanced through a pressurized treatment zone and is subjected to treatment with an ultrasonic wave within this pressurized treatment zone.

It should be noted that, while it is possible to add the individual polymers to the hopper as separate, individual components, the polymers to be treated may be premixed and pelletized before addition to an ultrasonic apparatus according to the present invention. Thus, as will be clearly appreciated in the experimental examples hereinbelow, the polymers may be premixed in an extruder absent any ultrasonic treatment, cooled, and thereafter pelletized such that non-treated, pelletized polymer mixtures are fed to the apparatus wherein the mixture is to be ultrasonically treated.

Pressure effects the process of the present invention by introducing volumetric compression in the molten blend, leading to more efficient propagation of the ultrasonic waves. Thus, generally, an increase in pressure exerted on the polymer blend during ultrasonic treatment will tend to increase the effect of the ultrasonic waves, while a decrease in the pressure exerted on the polymer blend during ultrasonic treatment will tend to decrease the effect of the ultrasonic waves. In a preferred embodiment of the present invention, the pressure at the entrance to the treatment zone is between about 0.6 to about 35 MPa, but lower and larger pressures are also envisioned. Additionally, as the pressure proximate gap 26 is dependant at least in part upon the size of gap 26, between exit 16 and horn 14, the size of gap 26 may be optimized. In a preferred embodiment of the present invention, gap 26 is between about 0.2 to about 10 mm. Notably, the optimal size of gap 26 may depend on such variables as amplitude, frequency, temperature, flow rate and the nature of the specific blend, and, therefore, the selection of an optimal size for gap 26 most likely will need to be determined experimentally for a given process. Such a determination through experimentation is within the ordinary skill in the art.

As the polymer blend approaches the tip of horn 14, the blend flows into the path of the ultrasonic waves generated by the horn. The arrangement of the horn allows the ultrasonic treatment to proceed in an environment not exposed to atmospheric oxygen, thereby minimizing the amount of product degradation that might otherwise occur. As discussed previously, gap 26 is preferably between about 0.2 and about 10 mm, but larger and smaller gaps are envisioned. In this condition, the polymer blend is required to pass through the treatment zone under sufficient pressure and in the ultrasonic wave path to ensure in situ compatibilization.

While the figures and ensuing discussion have focused in particular on the application of an extruder to advance the original polymer materials to a pressurized treatment zone, there is no reason to limit the invention to such. In fact, the only requirements essential for apparatus according to the present invention is that they be capable of advancing material, under pressure, toward a zone ultrasonic treatment.

Optionally, the extruder should be capable of being heated. The heating of the extruder tends to decrease the internal pressure and reduction of power consumption of the motor. The addition of heat to the polymer mixture advancing through apparatus 10 may also be necessary in some processes. Particularly, it should be noted that the polymer mixture is to be ultrasonically treated while in the molten state. Thus, when necessary, heat may be added to the system to properly carry out the invention. More particularly, the process of the present invention is carried out at a temperature that is above the melting temperature or glass transition temperature of the individual polymers within the mixture. Again, various polymer mixtures will require processes carried out at various temperatures, and operable temperatures may need to be determined experimentally for a given polymer mixture. Generally, the temperature at which the present process is carried out is preferably between about 20° C. and 400° C., although the process should not be limited thereto or thereby.

The energy imparted by the ultrasonic waves and imposed on the polymer mixture, in the presence of pressure and heat, is believed responsible for bringing about an in situ chemical interaction at the interface between the polymeric components, resulting in the improvement of mechanical properties of the polymer blends. Thus, both ultrasonic wave frequency and amplitude are notable processing parameters.

Considerable latitude is permissible in selection the wave frequency and amplitude of the ultrasonic treatment, and, as suggested in the preceding, optimum conditions for particular polymer mixtures are best determined by experimental trials conducted on the mixtures of interest. Within such considerations, however, it has been found that the frequency of the waves should be in the ultrasound region, i.e., at least 15 kHz. The amplitude of the wave can be varied from at least about 1 micron to about 100 microns, again, the exact amplitude and frequency best suited for a particular application being readily determined by experimentation.

While an ultrasonic reactor has been generally described so far containing mainly a single screw extruder with a single horn, there is no reason to limit the invention to such. As seen in FIGS. 2–8, multiple extruder combinations, mixing devices, horn configurations, horn positioning, horn numbers, and die/horn combinations are envisioned. There is no limit on the number of horns and die/horn combinations other than that which is a natural ramification of available space considerations. Additionally, although not necessarily preferred, it should be noted that the at least two polymers fed to any apparatus according to the present invention may be premixed before being fed. Such a premixing step is clearly set forth in the experimental examples provided hereinbelow.

Figure 2:
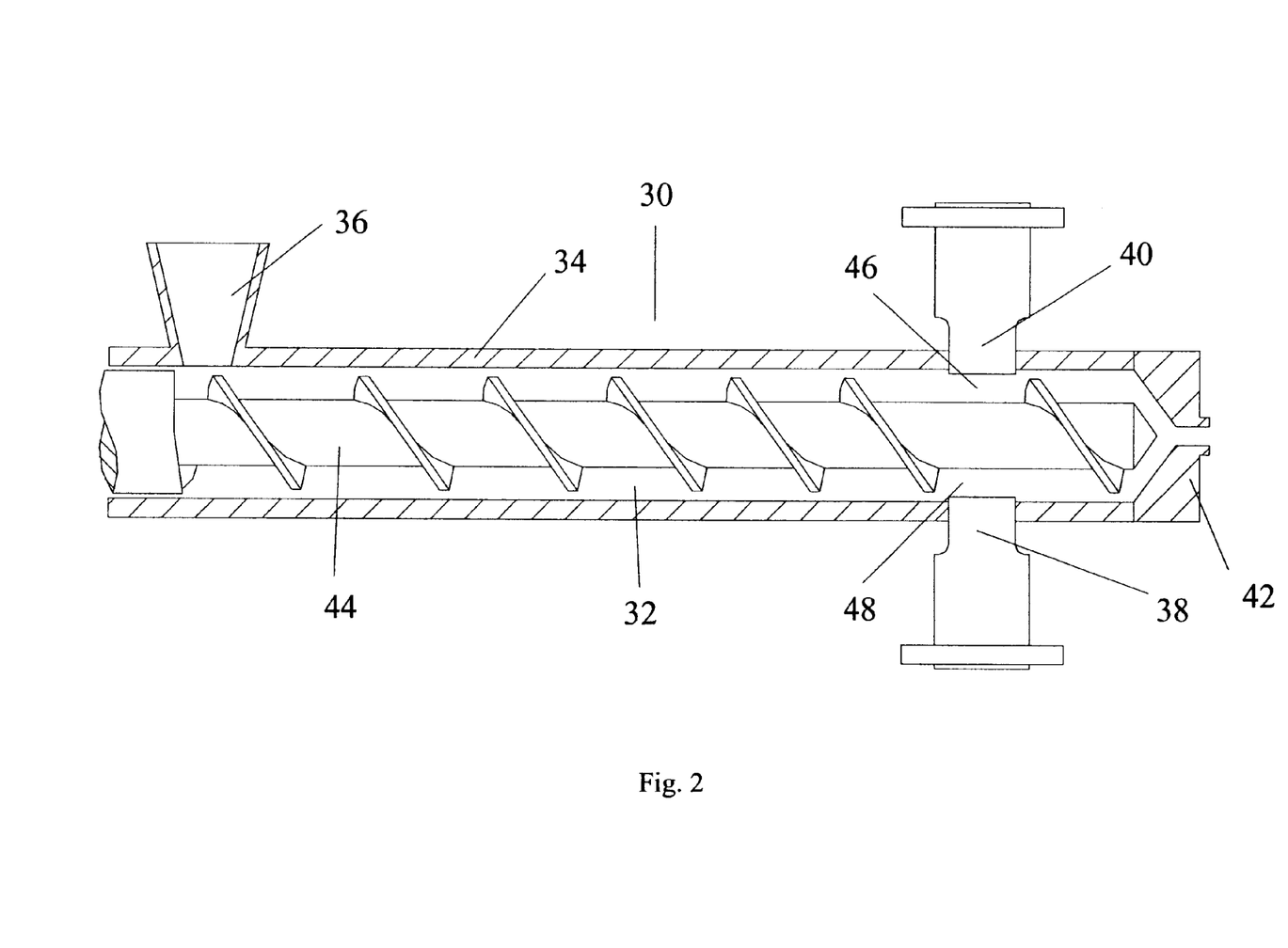
FIG. 2 is a schematic of a cross-sectional view of the ultrasonic reactor based on a single screw extruder and a die with two ultrasonic horns placed before the die in the extruder perpendicular to the screw axis.

As seen in FIG. 2, a double-horn embodiment of an apparatus for carrying out the process of the present invention is generally represented by the numeral 30. Apparatus 30 includes a single screw extruder 32, having a barrel 34 that is fed through hopper 36. Single screw extruder 32 is equipped with two ultrasonic horns 38, 40 placed before the die 42, which is perpendicular to the axis of screw 44. As with the previous arrangement of FIG. 1, the gaps 46, 48 between screw 44 and ultrasonic horns 38, 40, respectively, is between about 0.2 to about 10 mm and the pressure at the entrance to the treatment zone is between about 0.6 to about 35 MPa. As apparatus 30 of FIG. 2. begins to make clear, there is no limit on the position and number of horns (such as horns 38,40) in the extruder 32.

Figure 3:
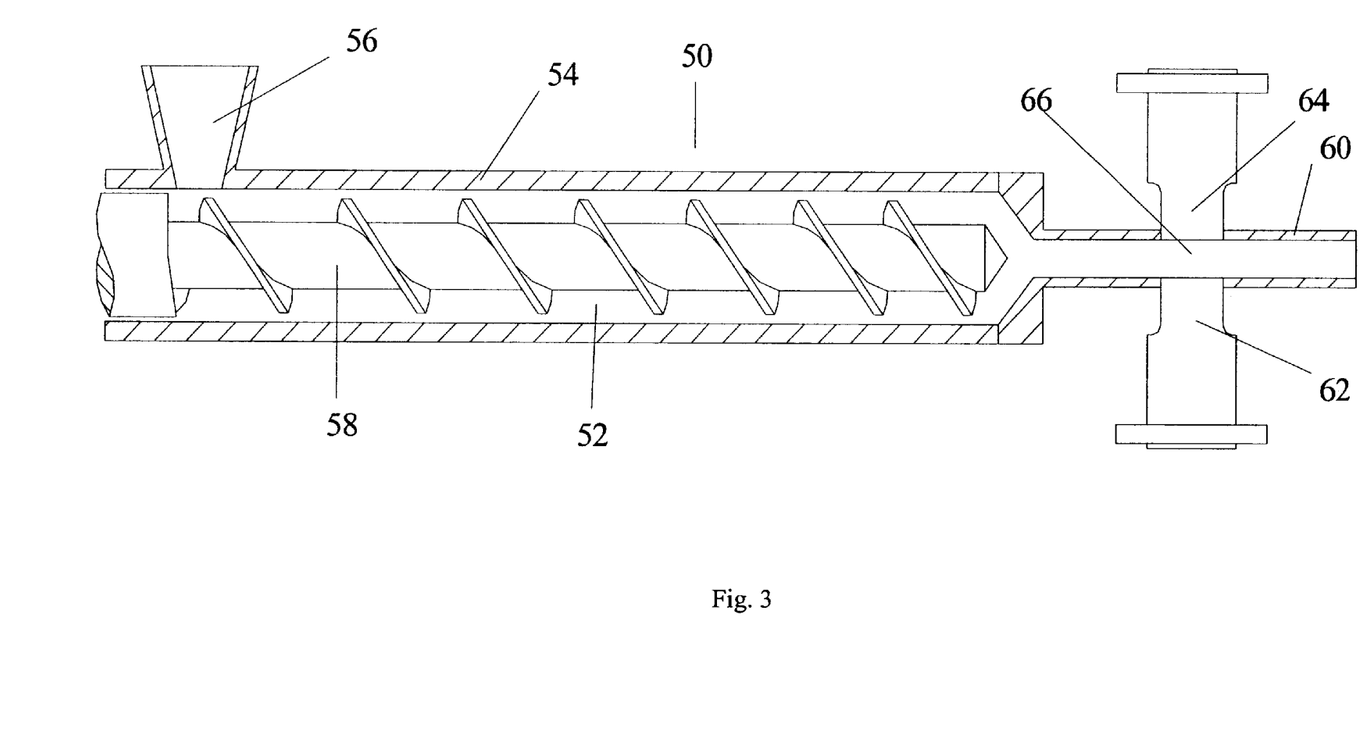
FIG. 3 is a schematic of a cross-sectional view of the ultrasonic reactor based on a single screw extruder an ultrasonic die attachment with two ultrasonic horns placed in the die perpendicular to its axis.

FIG. 3 illustrates a double-horn embodiment of an apparatus for carrying out the process of the present invention that is generally represented by the numeral 50. Apparatus 50 includes a single screw extruder 52, having a barrel 54 that is fed through hopper 56, and the materials being fed are advanced by screw 58. Apparatus 50 displays the ability to incorporate an ultrasonic die attachment 60 with two ultrasonic horns 62, 64 positioned in die 60, perpendicular to the axis of die 60. Two ultrasonic horns 62, 64 are positioned along parallel planes to the longitudinal axis of die 60. Ultrasonic horns 62, 64 are separated by a single gap 66, which is defined between the opposed surfaces of horns 62, 64. Notably, because gap 66 is between two horns 62, 64, the preferred dimension for gap 66 is generally twice the value for the gap in FIG. 1. Thus, a gap such as gap 66, between two opposed horns such as horns 62, 64, is preferably between about 0.4 to about 20 mm, although the present invention is not to be limited thereto or thereby inasmuch as the selection of an optimal size for gap 66 most likely will need to be determined experimentally for a given process.

In the embodiment employing single screw extruders it should be appreciated that Buss Ko-Kneader extruders or pin barrel extruders could alternatively be employed. Such extruders will typically achieve a better mixing of the polymers being fed, creating more interface between the polymers and thereby more efficient in situ chemical interaction upon ultrasonic treatment. Thus, single screw extruders are to be understood as including pin barrel extruders, Buss Ko-Kneader extruders, and other extruders containing one screw and providing efficient mixing as known in the art.

Figure 4:
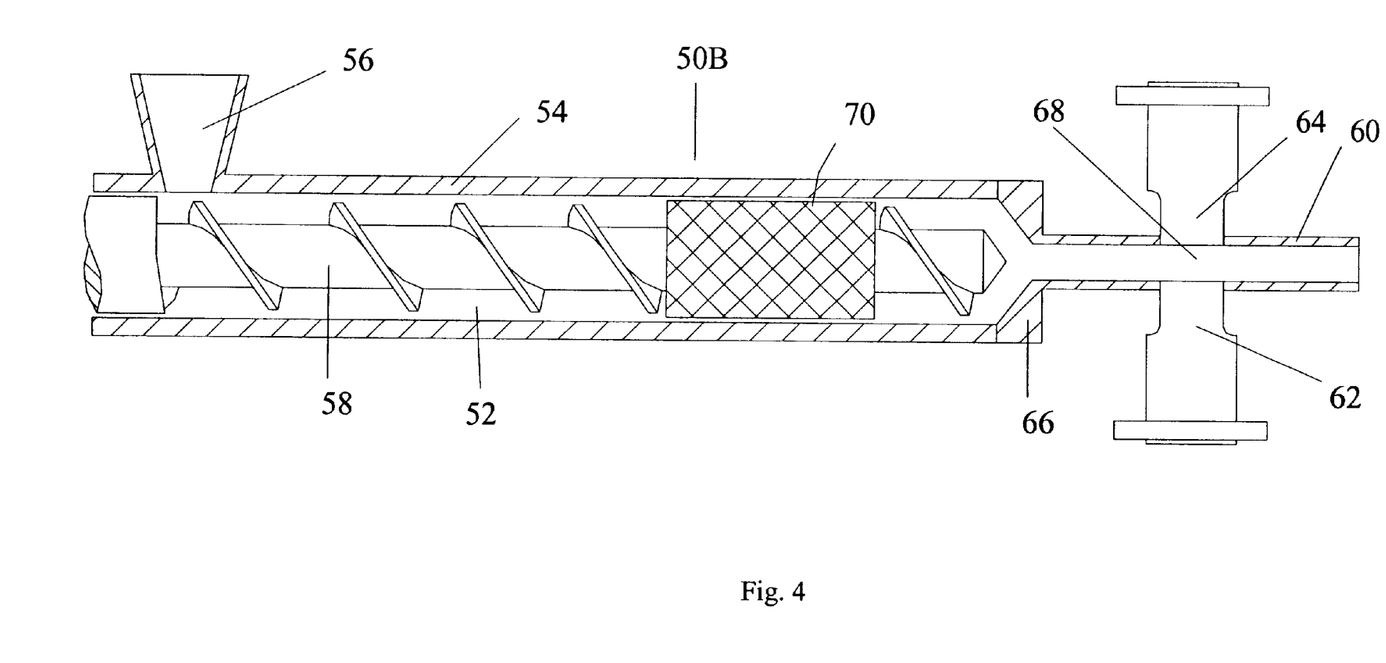
FIG. 4 is a schematic of a cross-sectional view of the ultrasonic reactor based on a single screw extruder having a mixing section and an ultrasonic die attachment with two ultrasonic horns placed in the die perpendicular to its axis.

Referring now to FIG. 4, it can be seen that extruders employed in carrying out the present invention may optionally be configured with a mixing section, generally represented in FIG. 4 at numeral 70. Particularly, FIG. 4 shows a double-horn embodiment of an apparatus for carrying out the process of the present invention that is generally represented by the numeral 50B. Apparatus 50B is substantially identical to apparatus 50 of FIG. 3, with like elements receiving identical numeral designations. However, apparatus 50B includes mixing section 70, within barrel 54, around screw 58. Mixing section 70 may be a dispersive and/or distributive mixing section, as are generally known and employed in the art to increase the degree of mixing of the components fed to an extruder such as extruder 52. Notably, such a mixing section 70 may be employed with any extruder previously described or hereinafter described.

Figure 5:
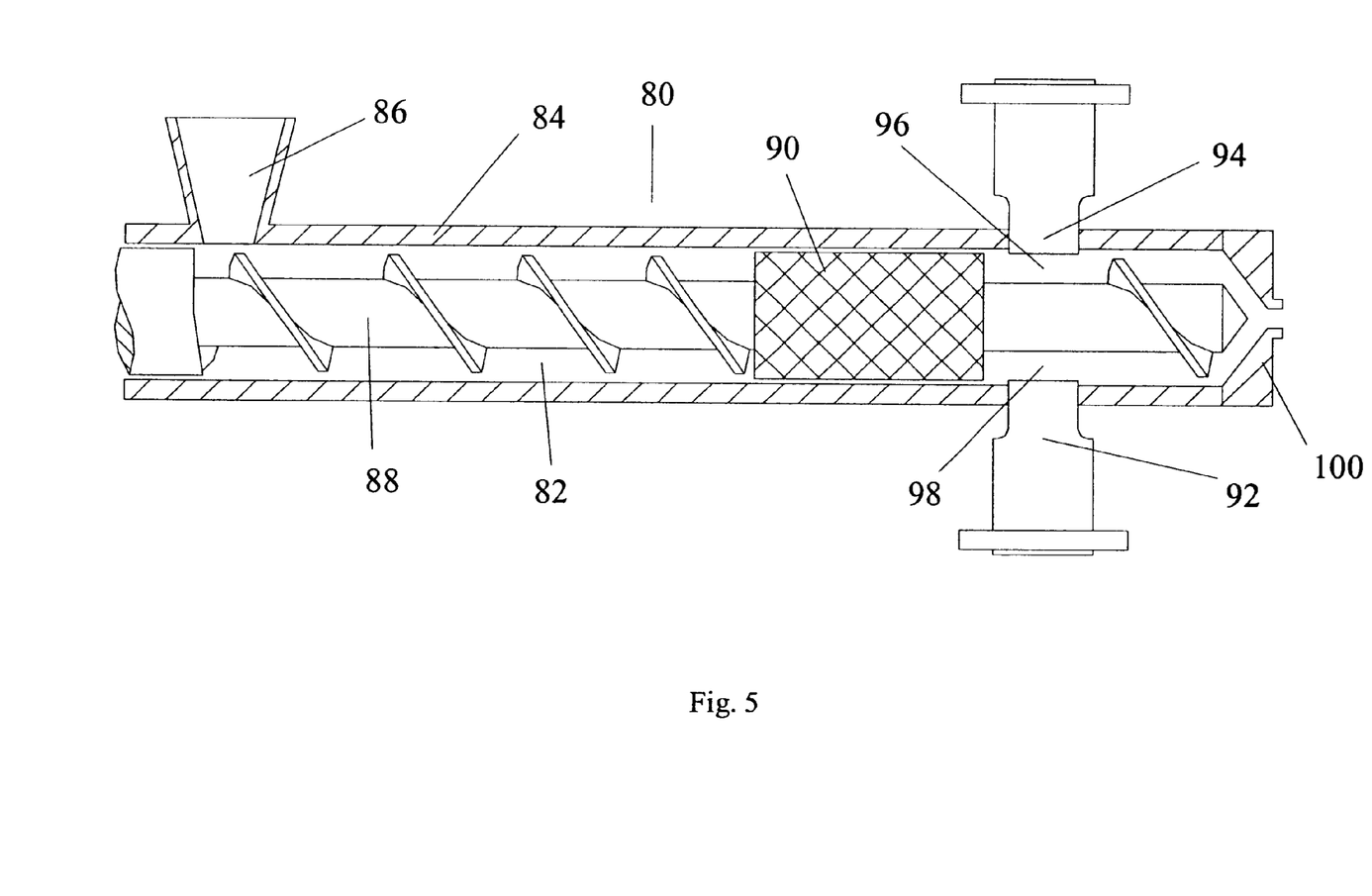
FIG. 5 is a schematic of a cross-sectional view of the ultrasonic reactor based on a single screw extruder having a mixing section and two ultrasonic horns placed before the die in the extruder after the mixing section perpendicular to the screw axis.

FIG. 5 illustrates a double-horn embodiment of an apparatus for carrying out the process of the present invention that is generally represented by the numeral 80. Apparatus 80 includes a single screw extruder 82, having a barrel 84 that is fed through hopper 86. The materials being fed are advanced by screw 88. Particularly, FIG. 5 illustrates a combination of single screw extruder 82 with mixing section 90 and two ultrasonic horns 92, 94 placed after the mixing section 90 in the extruder perpendicular to the axis of screw 88. Gaps 96, 98 exist between screw 88 and horns 92, 94, respectively. Thus, the pressurized treatment zone wherein the polymer mix fed to extruder 82 is subjected to ultrasonic treatment lies within barrel 84, within and proximate gaps 96,98. After such treatment, the polymer blend is extruded through die 100.

Figure 6:
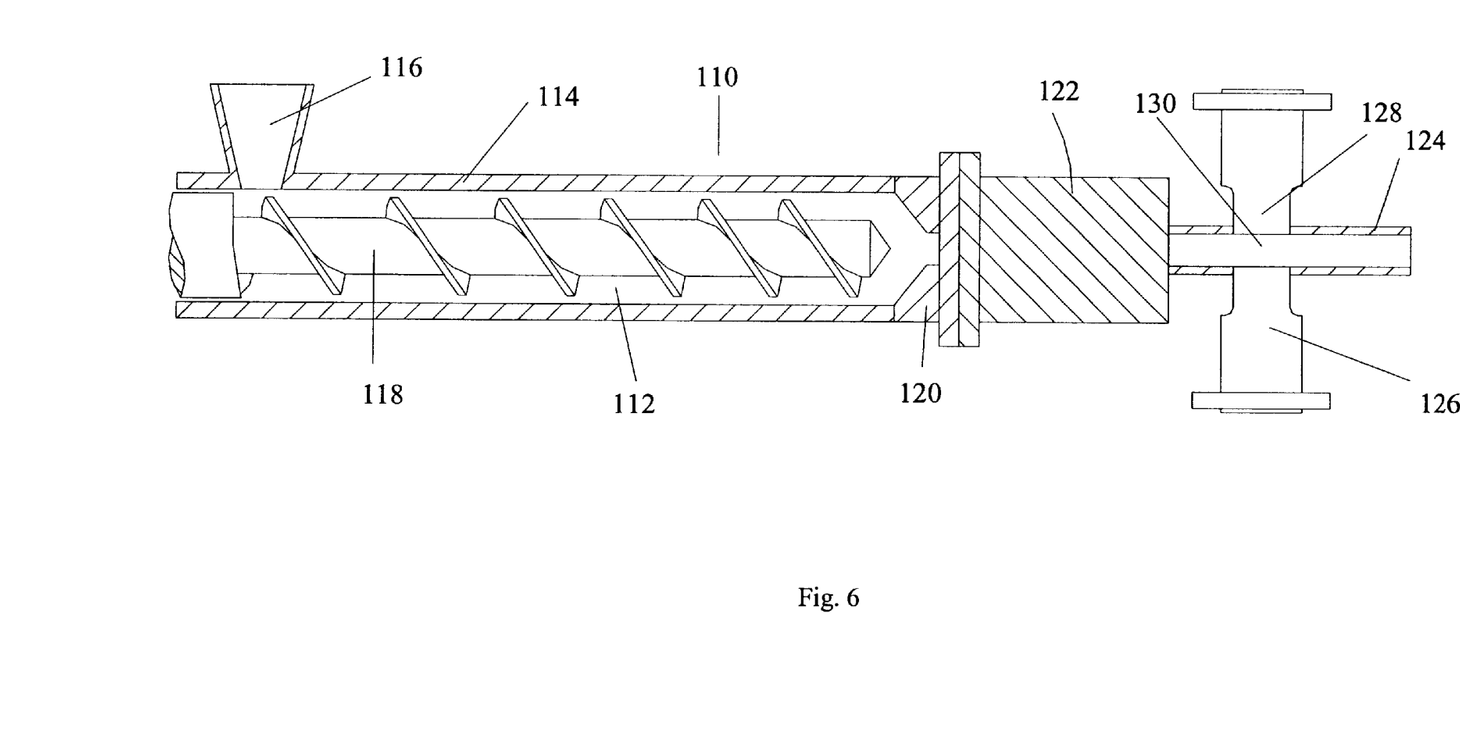
FIG. 6 is a schematic of a cross-sectional view of the ultrasonic reactor based on a single screw extruder with a static mixer followed by an ultrasonic die attachment with two ultrasonic horns placed in the die perpendicular to its axis.

With reference to FIG. 6, another double-horn embodiment of an apparatus for carrying out the process of the present invention is designated generally by the numeral 110. FIG. 6 shows a single screw extruder 112, having a barrel 114 that is fed through hopper 116. The materials being fed are advanced by screw 118 through die 120 and into a static mixer 122, which serves to more adequately mix the various polymer components fed into extruder 112 before the polymer mix is treated with ultrasonic waves. Upon exiting static mixer 122, the polymer mix is advanced through die 124, which is substantially like die 60 of FIG. 3, having horns 126, 128 and a single gap 130.

Figure 7:
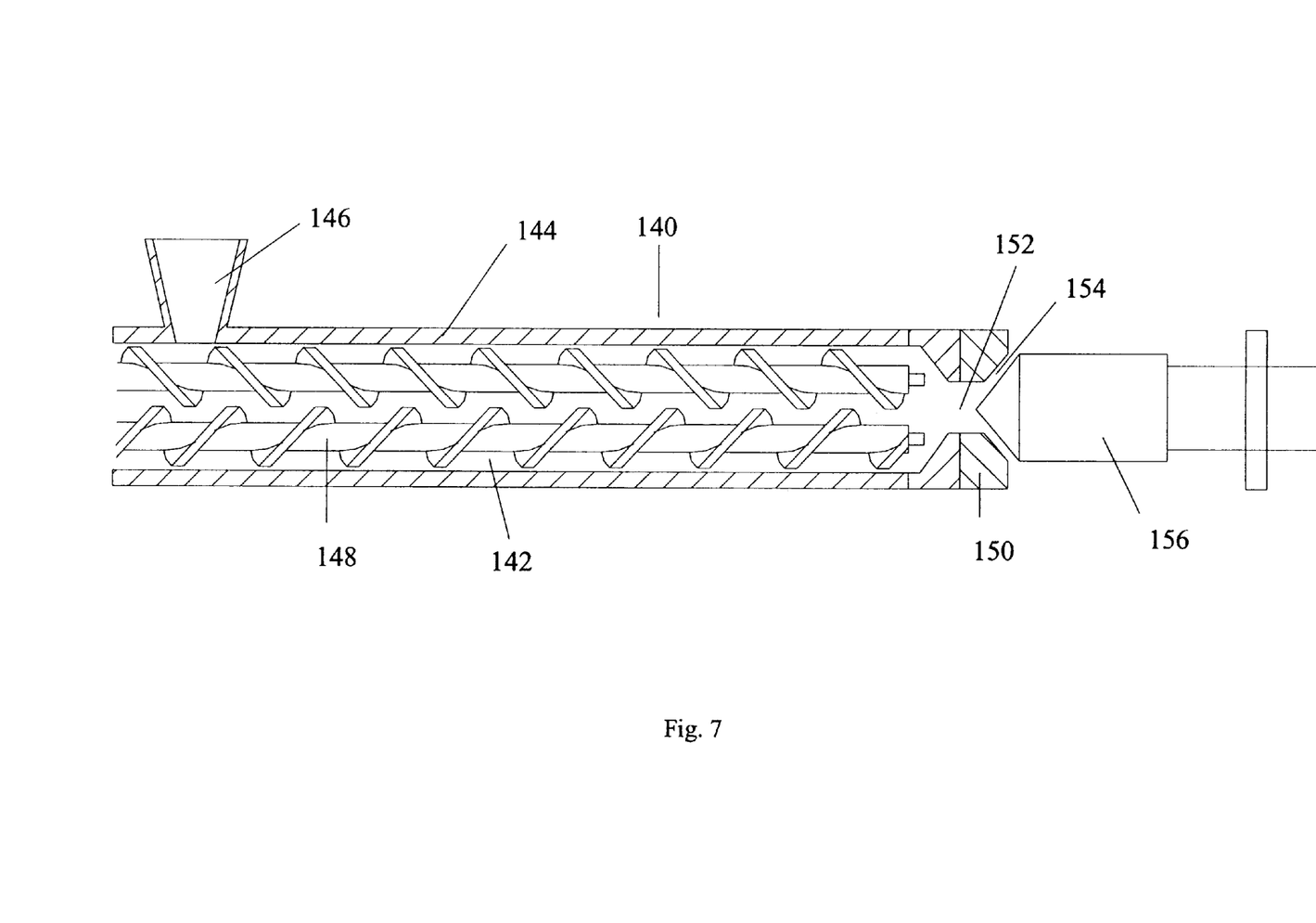
FIG. 7 is a schematic of a cross-sectional view of the ultrasonic reactor based on a twin screw extruder with ultrasonic die attachment having one ultrasonic horn placed at the die exit parallel to the die axis.

FIG. 7 is a schematic representation of a twin screw extruder embodiment of an apparatus for carrying out the process of the present invention generally represented by the numeral 140. Apparatus 140 includes a twin screw extruder 142, having a barrel 144 that is fed through hopper 146. The polymers being fed are advanced by twin screws 148 through die 150 and, more particularly, extruded through exit 152 toward gap 154 and horn 156. Notably, die 150, exit 152, gap 154, and horn 156 are interrelated substantially as like parts in FIG. 1. Twin screw extruder 142 is desirable because, as is generally known in the art, it provides a more efficient mixing of the polymer components fed to hopper 146 than does a single screw extruder.

Figure 8:
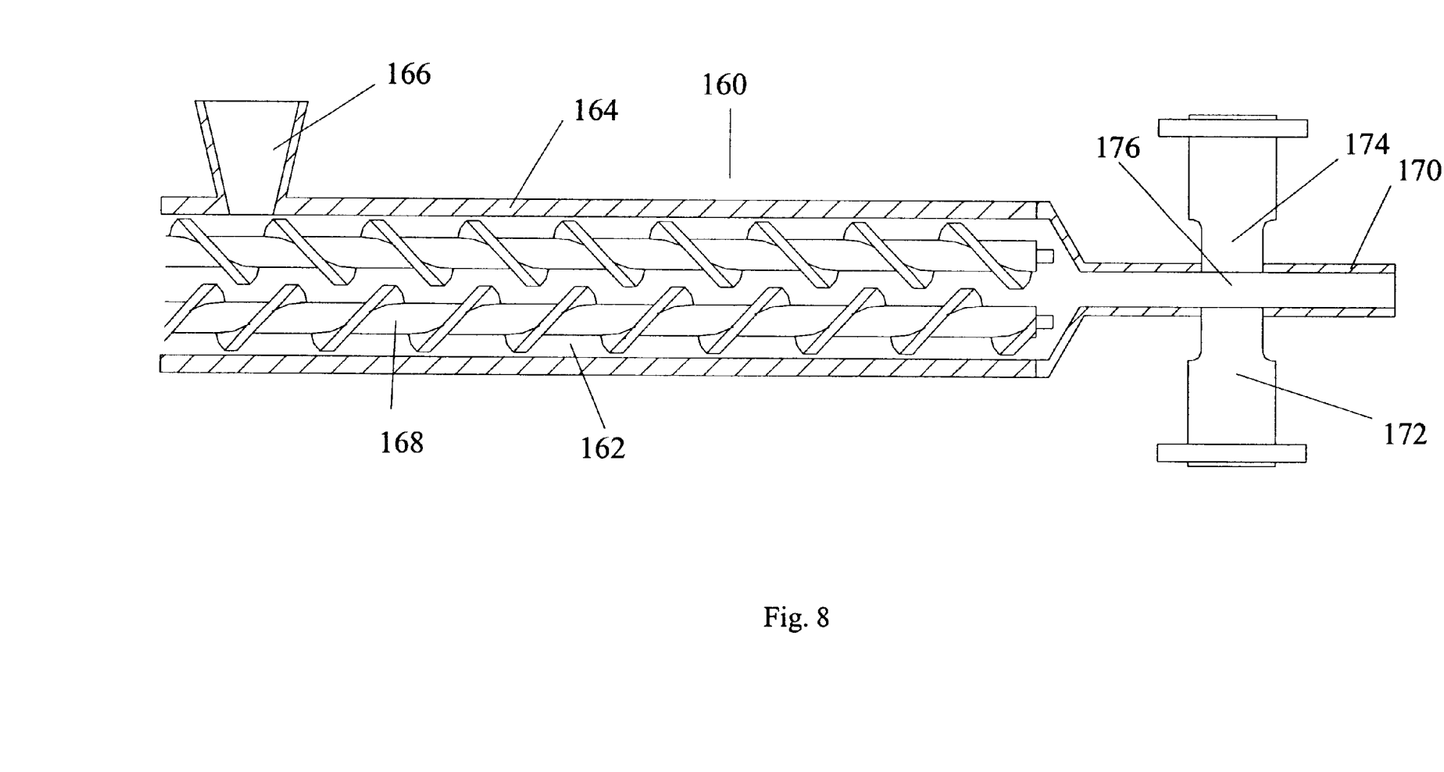
FIG. 8 is a schematic of a cross-sectional view of the ultrasonic reactor based on a twin screw extruder with ultrasonic die attachment having two ultrasonic horns placed in the die perpendicular to its axis.

FIG. 8 illustrates a twin screw extruder embodiment of an apparatus for carrying out the process of the present invention generally represented by the numeral 160. Apparatus 160 includes a twin screw extruder 162, having a barrel 164 that is fed through hopper 166. The polymers being fed are advanced by twin screws 168 through die 170, which is substantially identical to die 60 of FIG. 3, and includes horns 172, 174 and gap 176.

Figure 9:
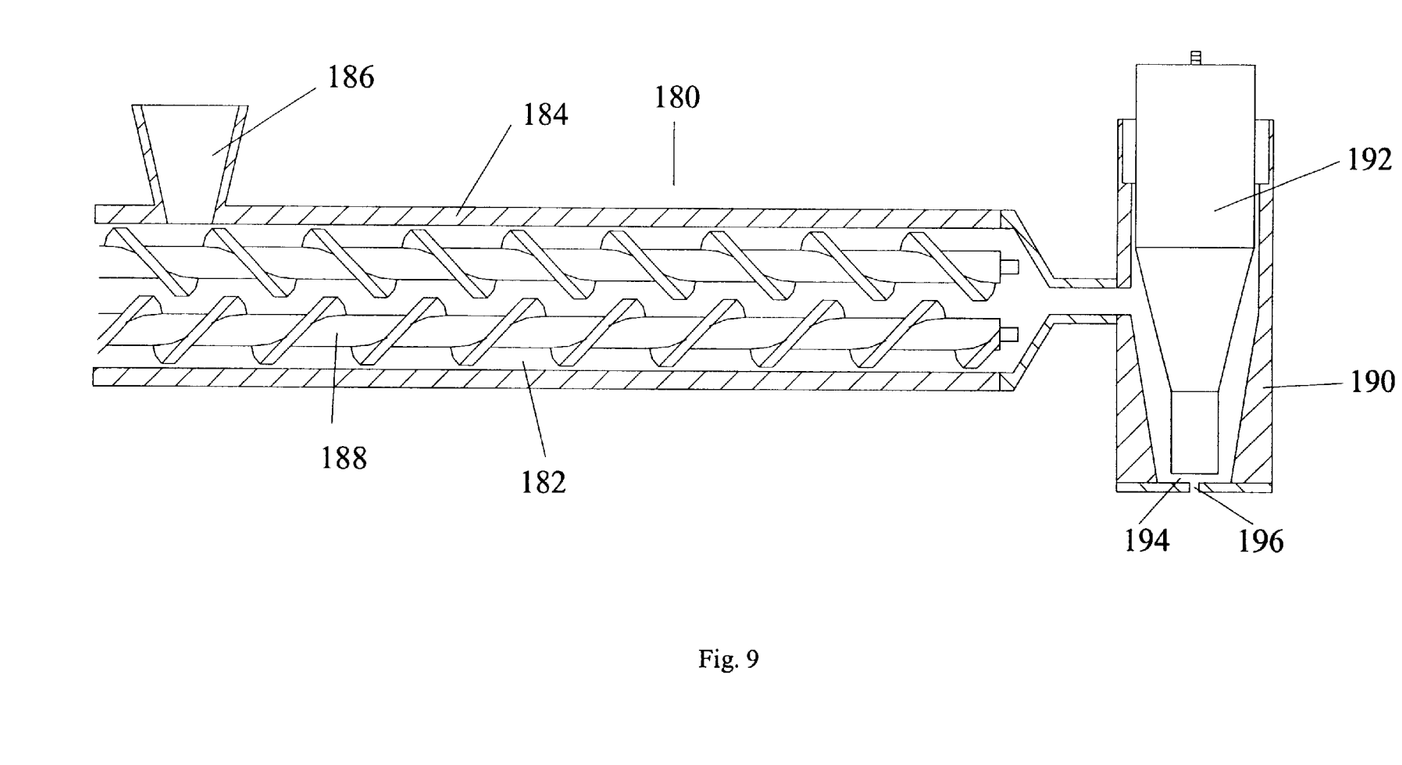
FIG. 9 is a schematic of a cross-sectional view of the ultrasonic reactor based on a twin screw extruder wherein an ultrasonic horn cross-head die assembly is employed.

FIG. 9 illustrates a twin screw extruder reactor having a die assembly attached thereto, the combination being generally represented by the numeral 180. The combination extruder and die assembly 180 includes a twin screw extruder 182 having a barrel 184 that is fed through hopper 186. The polymers being fed are advanced by twin screws 188 toward die assembly 190 having ultrasonic horn 192 retained therein. As can be seen, the polymers enter die assembly 190 perpendicular to the longitudinal axis of horn 192. The polymers fill die assembly 190 to be forced, under a pressure preferably in the range of from about 0.6 to about 35 MPa, through gap 194, preferably having dimensions in the range of from about 0.2 mm about 10 mm, and out exit 196.

In the embodiment employing twin screw extruders it should be appreciated that modular twin screw extruders should preferably be employed. Modular twin screw extruders will typically achieve a better mixing of the polymers being fed, creating more interface between the polymers and thereby more efficient in situ chemical interaction upon ultrasonic treatment.

In its simplest mode of operation, the reactor is fitted at its exit bore with a die having one inlet bore and one exit bore. However, there is no reason to limit the invention to such. It is also within the scope of the invention that the die and/or reactor exit bore be of constant dimensions, or varying dimensions. The shape of the pressurized treatment zone can also be varied. It can be a straight, angular, or helical channel. The important consideration is that the polymers are forced to pass through the channel or channels and are subjected to the ultrasonic treatment.

Figure 10:
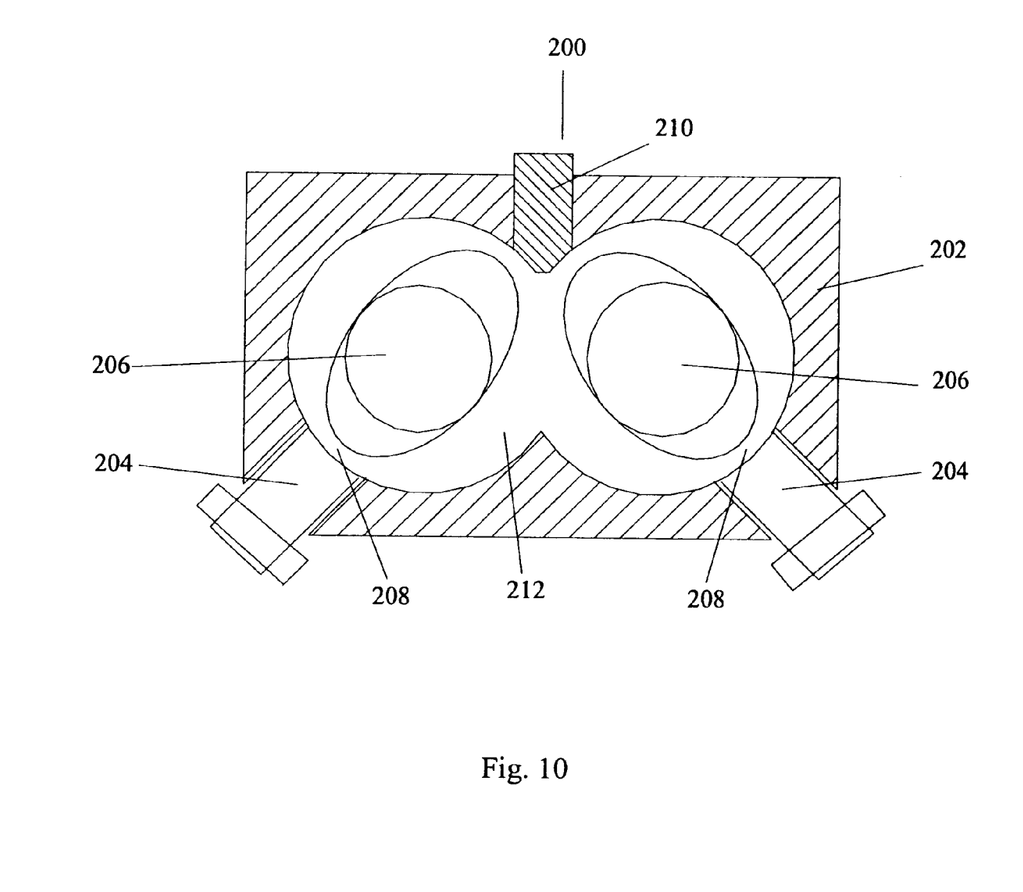
FIG. 10 is a schematic of a cross-sectional view of the ultrasonic reactor based on a batch mixer.

Polymers may also be treated in batch mixers according to the present invention, and the design considerations with respect to such an embodiment will be readily appreciated by those of ordinary skill in the art. To generally disclose this embodiment, reference is now made to FIG. 10, wherein a batch mixer according to the present invention is represented by the numeral 200. Generally, at least one area of the wall 202 of batch mixer 200 is adapted to receive an ultrasonic horn 204, similar, for example, to the manner in which the barrel of the extruder is adapted to receive an ultrasonic horn in FIG. 5. However, to provide the pressurized treatment zone for treatment of the polymer mix within batch mixer 200, batch mixer 200 is equipped with rotors 206, which are distanced from the ultrasonic horn 202 so as to provide a gap 208 of from about 0.2 mm to about 10 mm, and is further equipped with ram 210 which serves to pressurize the mixing chamber 212 as is generally known in the art. As the polymer mix is forced through the area proximate gap 208, the polymer is necessarily subjected to increased pressure, preferably in the range of from about 0.6 to about 35 MPa. It is in this pressurized treatment zone, proximate the ultrasonic horn 204 and gap 208, that the in situ compatibilization occurs, as within the continuous extruders discussed above. Ultrasonic horn 204 is operated at a frequency within the ultrasonic region, namely, at about at least 15 kHz.

In order to demonstrate the practice of the present invention, the following examples have been prepared and tested as described in the General Experimentation section hereinbelow. The examples should not, however, be viewed as limiting the scope of the invention. The claims will serve to define the invention.

General Experimentation

EXAMPLE 1

Polymer blends according to the present invention were prepared. Polyolefins (high-density polyethylene (HDPE) or polypropylene (PP)) and uncured rubbers (natural rubber (NR), styrene-butadiene rubber (SBR) or ethylene-propylene-diene rubber (EPDM)) were first mixed using a modular twin screw extruder (JSW Labotex30) before ultrasonic treatment. The composition of each of these polymer blends, based on weight percent, was 50:50. The feed rate was 60 g/min. Screw speed was set at 150 rpm and zone temperatures were setto 140° C./140° C./145° C./150° C./150° C./155° C./160° C./160° C. for HDPE/rubber blends and 165° C./165° C./175° C./180° C./180° C./185° C./190° C./190° C. for PP/rubber blends. After the mixtures were extruded from the twin screw extruder, the extrudates were cooled, pelletized and then dried in a vacuum oven for 24 hours at a temperature of 60° C.

After drying, the blends were ultrasonically treated using a 1.5 inch single screw extruder with ultrasonic attachment (shown in FIG. 2). A 3KW ultrasonic power supply was used. Two ultrasonic horns vibrate longitudinally with a frequency of 20 kHz at amplitude 6 and 10 $\mu$m. The temperature of the extruder barrel was 150° C. for HDPE/rubber blends and 190° C. for PP/rubber blends. The feed rate was 0.63 g/sec. Screw speed was 20 rpm. The gap between the horn and screw shaft was set at 2 mm.

The compression molding of sheets (127×127×2 mm$^3$) was performed using an electrically heated compression molding press (Wabash). The mold was at a temperature of 160° C. for HDPE/rubber blends and 180° C. for PP/rubber blends and under a pressure of 13.8 MPa that was maintained for 5 minutes. The samples were kept under compression and cooled in water to maintain the overall dimensional stability and flatness of the sheets.

An Instron tensile tester (model 5567) was used for the tensile property measurements. All tests were performed at room temperature with a crosshead speed of 500 mm/min. Young's modulus was measured at 3% strain.

Results for the various blends produced through the above experimentation are displayed in Tables 1 through 5.

EXAMPLE 2

An NR/SBR blend was prepared by ultrasonic treatment. The NR/SBR blend was first prepared on a two-roll mill (Dependable Rubber Machinery Co.) at 50° C. The rubbers were added to the nip in the rolls and masticated for 5 minutes. The composition of NR/SBR blend was 50/50 wt. %.

The blend was then ultrasonically treated in a 1.5 inch single screw extruder with an ultrasonic die attachment with one horn (shown in FIG. 1). The temperature of the extruder barrel was set at 120° C. The gap between the die and horn was set at 2.54 mm. The flow rate was 0.63 g/s. The ultrasonic treatment was carried out at a frequency of 20 kHz and at amplitudes of 5 and 7.5 $\mu$m.

The untreated and ultrasonically treated NR/SBR blends were compounded on a two-roll mill (Dependable Rubber Machinery Co.) at 50° C. with 2 phr of sulfur, 5 phr of zinc oxide, 1 phr of stearic acid, and 1.1 phr of CBS (N-cyclohexylbenzothiazole-2-sulfenamide). The blends were added to the nip in the rolls and masticated for 1 minute. The ingredients were then slowly added to the rolling bank followed by alternating cuts for 6 minutes to achieve a homogenization of the rubber constitution.

The compression molding of slabs (127×127×2 mm$^3$) was performed using an electrically heated compression molding press (Wabash) at 160° C. The cure time was determined based on the time to achieve the maximum torque on the cure curve measured by a Monsanto oscillating disc rheometer according to ASTM D2084. The torque-time curve was measured at 160° C.

An Instron tensile tester (model 5567) was used for the tensile property measurement according to ASTM D412 (type C). All tests were performed at room temperature with a crosshead speed of 500 mm/min.

The results for the NR/SBR blend herein under study are displayed in Table 6.

Discussion

As is evident from Tables 1–5, ultrasonic treatment of polymer (plastic/rubber) blends greatly enhanced their mechanical properties. Ultrasonic treatment significantly increased tensile stress, elongation at break, Young's modulus and toughness of each blend as compared to the untreated blend. In Table 6, tensile stress, elongation at break, and toughness of the rubber/rubber blend were improved by ultrasonic treatment.

Without wishing to be bound by any theory, the improved mechanical properties typically observed, as shown experimentally hereinabove, are believed to result from an in situ chemical interaction at the interface between dissimilar polymers and the vicinity thereto during a very short time (in the order of few seconds) of ultrasonic treatment under high pressures and temperatures. This chemical interaction is experimentally supported as being a chemical (i.e. non-physical or mechanical) interaction wherein at least a portion of the polymers blended are chemically linked via a chemical reaction that is not hydrogen bonding. In particular, experimental evidence supports the conclusion that this in situ chemical interaction forms copolymers or grafted polymers at a portion of the interface between the blended polymers. This chemical interaction occurs rapidly, in a very short time, on the order of seconds. Generally, only a fraction of the at least two polymers blended undergo this in situ chemical interaction. It is believed that these copolymers or grafted polymers, created at the interface and the vicinity thereto lead to the improved adhesion between two dissimilar polymers and also dispersion of polymers in the blends.

Experimental results support the belief that copolymers or grafted polymers are created through the process of the present invention. Particularly, Table 7 shows the results of an extraction experiment in which samples of ultrasonically treated polypropylene/natural rubber mixtures (the test mixtures) were compared with a non-treated polypropylene/natural rubber mix (the control mixture). In the extraction experiment, three mixtures of 50% polypropylene (PP) and 50% natural rubber (NR) were tested. The control mixture was not ultrasonically treated, while one test mixture was treated with ultrasonic waves with amplitude of 6 $\mu$m, and the second test mixture was treated with ultrasonic waves of 10 $\mu$m. After treatment (or non-treatment in the case of the control mixture), each mixture was subjected to soxhlet extraction, using benzene as a solvent to dissolve any natural rubber present in the mixture.

As table 7 shows, 49.8% (approx. 50%) of the control mixture was not extracted, showing that the natural rubber content was unchanged as was expected inasmuch as the control mixture was not treated. However, 56.1% of the test mixture treated at 6 $\mu$m was not extracted, and 54.1% of the test mixture treated at 10 $\mu$m was not extracted, supporting the conclusion that a fraction of the polypropylene and natural rubber polymers within the 50/50 PP/NR chemically interacted such that the benzene could not extract that fraction. These results, coupled with the increase in mechanical properties shown in Table 1 for ultrasonically treated PP/NR mixtures, supports the conclusion that copolymers or grafted polymers were created through the process of the present invention, although the present invention is not limited to or by this theory.

Figure 11:
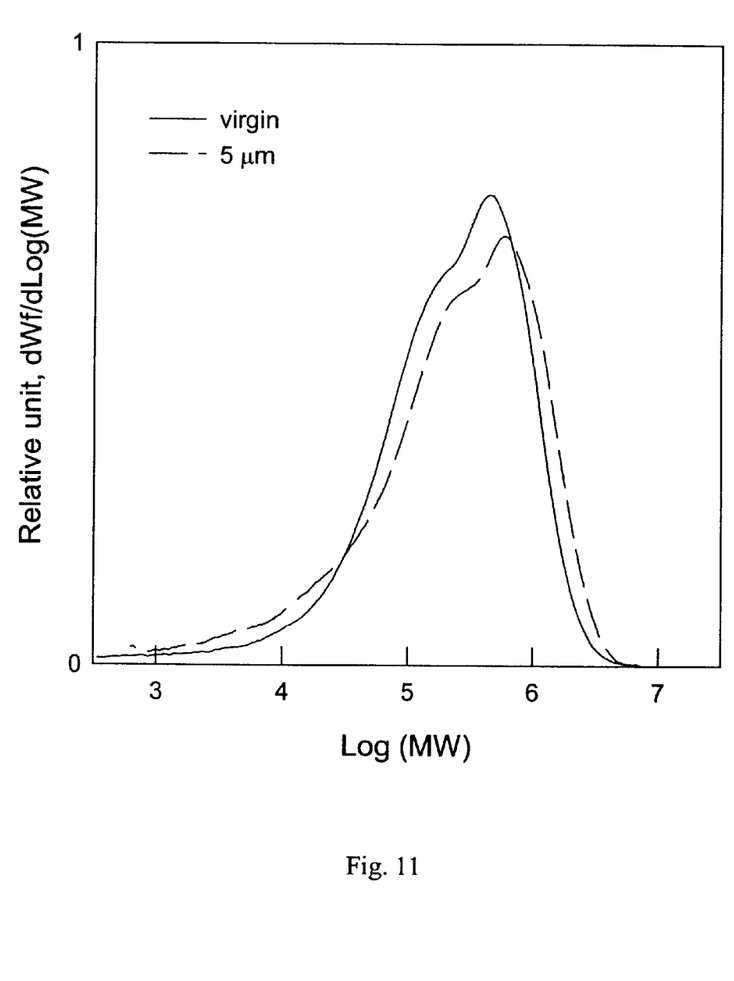
FIG. 11 is a graph showing the molecular weight distributions for treated and non-treated polymer blends of natural rubber with styrene-butadiene rubber.

Additionally, as seen in FIG. 11, natural rubber and styrene-butadiene rubber mixtures exhibit a broadening of molecular weight distributions when treated with ultrasonic waves. The increase in the high molecular weight tail also supports the conclusion that copolymers or grafted polymers are formed between the natural rubber and styrene butadiene rubber within the mix, although, again, the present invention is not to be limited to or by this theory.

TABLE 1

PP/NR (50/50 wt. %) blends

|  | Tensile Stress, MPa | Elongation at break, % | Young's Modulus, MPa | Toughness, MPa |
|---|---|---|---|---|
| Untreated | 8.39 | 38.9 | 191.0 | 2.99 |
| Treated (6 $\mu$m) | 11.27 | 111.7 | 250.0 | 12.19 |
| Treated (10 $\mu$m) | 10.60 | 126.8 | 215.0 | 13.19 |

TABLE 2

PP/EPDM (50/50 wt. %) blends

|  | Tensile Stress, MPa | Elongation at break, % | Young's Modulus, MPa | Toughness, MPa |
|---|---|---|---|---|
| Untreated | 9.87 | 29.1 | 229.0 | 2.68 |
| Treated (6 $\mu$m) | 10.51 | 87.6 | 261.0 | 9.00 |
| Treated (10 $\mu$m) | 10.48 | 121.2 | 278.0 | 12.53 |

TABLE 3

HDPE/NR (50/50 wt. %) blends

|  | Tensile Stress, MPa | Elongation at break, % | Young's Modulus, MPa | Toughness, MPa |
|---|---|---|---|---|
| Untreated | 4.92 | 189.0 | 75.1 | 8.17 |
| Treated (6 $\mu$m) | 5.71 | 300.6 | 126.5 | 16.00 |
| Treated (10 $\mu$m) | 5.78 | 299.1 | 127.0 | 16.35 |

TABLE 4

HDPE/EPDM (50/50 wt. %) blends

|  | Tensile Stress, MPa | Elongation at break, % | Young's Modulus, MPa | Toughness, MPa |
|---|---|---|---|---|
| Untreated | 4.74 | 88.2 | 103.0 | 4.24 |
| Treated (6 $\mu$m) | 4.78 | 116.0 | 109.0 | 5.76 |
| Treated (10 $\mu$m) | 4.84 | 147.8 | 125.0 | 7.62 |

TABLE 5

HDPE/SBR (50/50 wt. %) blends

|  | Tensile Stress, MPa | Elongation at break, % | Young's Modulus, MPa | Toughness, MPa |
|---|---|---|---|---|
| Untreated | 5.33 | 15.4 | 59.0 | 0.59 |
| Treated (6 $\mu$m) | 5.46 | 28.7 | 101.0 | 1.32 |
| Treated (10 $\mu$m) | 5.58 | 32.5 | 129.0 | 1.61 |

TABLE 6

NR/SBR (50/50 wt. %) blends

|  | Tensile Stress, MPa | Elongation at break, % | Young's Modulus, MPa | Toughness, MPa |
|---|---|---|---|---|
| Untreated | 2.89 | 378.4 | 0.89 | 5.20 |
| Treated (6 $\mu$m) | 4.41 | 522.1 | 0.70 | 8.37 |
| Treated (10 $\mu$m) | 7.82 | 601.7 | 0.67 | 12.73 |

TABLE 7

PP/NR Extraction Experiment

| Ultrasound Amplitude | 0 $\mu$m | 6 $\mu$m | 10 $\mu$m |
|---|---|---|---|
| Unextracted Fraction (wt. %) | 49.8 | 56.1 | 54.1 |

While the best mode and preferred embodiment of the invention has been set forth in accord with the patent statues, the scope of this invention is not limited thereto, but rather is defined by the attached claims. Thus, the scope of the invention includes all modifications and variations that may fall within the scope of the claims.

What is claimed is:

1. A process for the production of polymer blends and copolymers comprising the steps of:
   feeding to a pressurized treatment zone a polymer mixture consisting essentially of at least two polymers; and
   ultrasonically treating the polymer mixture in the treatment zone with an ultrasonic wave to provide in situ chemical interaction between said at least two polymers.

2. A process for the production of polymer blends and copolymers comprising the steps of:
   pelletizing at least two polymers;
   mixing said at least two polymers after said step of pelletizing to form a polymer mixture;
   feeding to a pressurized treatment zone the polymer mixture; and
   ultrasonically treating the polymer mixture in the treatment zone with an ultrasonic wave to provide in situ chemical interaction between the at least two polymers.

3. The process according to claim 1, wherein the treatment zone has a pressure from about 0.6 to about 35 MPa.

4. The process of claim 1, further comprising the step of heating the polymer mixture to a temperature that is above the melting temperature or glass transition temperature of the at least two polymers within the polymer mixture.

5. The process of claim 4, wherein said step of heating involves heating the polymer mixture to a temperature from about 20° C. to about 400° C.

6. The process of claim 1, wherein the amplitude of the ultrasonic wave is from about 1 micron to about 100 microns.

7. The process of claim 1, wherein the frequency of the ultrasonic wave is at least about 15 kHz.

8. A process for the production of polymer blends and copolymers comprising the steps of:
   feeding to a pressurized treatment zone a polymer mixture of at least two polymers; and
   ultrasonically treating the polymer mixture in the treatment zone with an ultrasonic wave to provide in situ chemical interaction between said at least two polymers wherein said step of feeding includes mixing the at least two polymers with distributive and/or dispersive mixing devices.

9. The process of claim 1, wherein said step of feeding to a pressurized treatment zone includes feeding to a batch mixer.

10. The process of claim 9, wherein the batch mixer is adapted to functionally receive at least one ultrasonic horn.

11. The process of claim 10, wherein the batch mixer contains at least one rotor.

12. The process of claim 9, wherein the batch mixer is selected from the group consisting of Banbury mixers, Farrel mixers, and Haake mixers.

13. The process of claim 1, wherein said step of feeding to a pressurized treatment zone includes feeding to a continuous mixer.

14. The process of claim 12, wherein the continuous mixer is selected from the group consisting of single screw extruders, twin screw extruders and modular twin screw extruders.

15. The process of claim 13, wherein the continuous mixer includes a static mixer.

16. The process of claim 1, wherein said step of feeding to a pressurized treatment zone includes feeding to a die attachment.

17. The process of claim 1, wherein the at least two polymers are selected from the group consisting of natural rubbers, isoprene rubbers, styrene-butadiene rubbers, butyl rubbers, nitrile rubbers, polyurethane rubbers, fluoroelastomer rubbers, silicone rubbers, ethylene propylene diene rubbers, butadiene rubbers, chloroprene rubbers, polyethylenes, polypropylenes, polyvinylchlorides, polystyrenes, polyesters, copolyesters, polyamides, polyimides, polyetheretherketones, polysulfones, acetals, polyarylates, polyacrylates, polyurethanes, epoxy resins, and wholly aromatic polyesters.

18. A polymer blend made by the process of claim 1.

* * * * *